United States Patent [19]
Zwicker et al.

[11] 4,423,291
[45] Dec. 27, 1983

[54] METHOD FOR OPERATING A SPEECH RECOGNITION DEVICE

[75] Inventors: Eberhard Zwicker, Icking; Wolfgang Daxer, Munich, both of Fed. Rep. of Germany

[73] Assignee: Siemens Aktiengesellschaft, Berlin & Munich, Fed. Rep. of Germany

[21] Appl. No.: 231,452

[22] Filed: Feb. 4, 1981

[30] Foreign Application Priority Data

Mar. 7, 1980 [DE] Fed. Rep. of Germany ....... 3008830

[51] Int. Cl.³ .............................................. G10L 1/00
[52] U.S. Cl. .................................................. 381/43
[58] Field of Search .......... 179/1 SD, 1 SM, 15.55 R, 179/15.55 T; 364/513

[56] References Cited

U.S. PATENT DOCUMENTS

| | | | |
|---|---|---|---|
| 3,588,363 | 6/1971 | Herscher | 179/1 SD |
| 3,928,724 | 12/1975 | Byram et al. | 179/1 SD |
| 4,063,031 | 12/1977 | Grunza | 179/1 SD |
| 4,292,470 | 9/1981 | An | 179/1 SD |

Primary Examiner—Emanuel S. Kemeny
Attorney, Agent, or Firm—Hill, Van Santen, Steadman & Simpson

[57] ABSTRACT

Speech recognition is improved by time-standardization of reference and unknown words of constant bit-length formed by suppressing bits or generating copy bits.

10 Claims, 2 Drawing Figures

METHOD FOR OPERATING A SPEECH RECOGNITION DEVICE

BACKGROUND OF THE INVENTION

1. Field of the Invention

This invention relates to a method for operating a speech recognition device and more particularly to such a method in which there is a facility for accommodating a variety of speaking rates.

2. The Prior Art

Speech recognition apparatus and methods of operating the same are described in "Kybernetic", June 1968, Volume 4, pages 228–234. As described therein, it is necessary to standardize the incoming speech-representative signals to prescribed word lengths, i.e., time duration, since the same word, when spoken by different speakers, may be spoken at different speeds. A disadvantage of the method described therein, however, is that a relatively long time is required for the time standardization of the incoming signals, and for the comparison of them with stored data.

SUMMARY OF THE INVENTION

It is the principal object of the present invention to provide a method of operating a speech recognition device in which the time standardization of an incoming speech signal, and its comparison with stored data, is accomplished more rapidly.

In one embodiment of the present invention this object is achieved by chronologically expanding or compressing digitized sampling values of an incoming speech signal, by means of simple and rapid transcription of data within a memory, without any significant distortion of the information in so doing. The present invention also allows for the simple and rapid comparison between the transcribed digitized sampling by use of the speech signal, and corresponding stored data.

These and other objects and advantages of the present invention will become manifest by an examination of the following description and accompanying drawings.

BRIEF DESCRIPTION OF THE DRAWINGS

Reference will now be made to the accompanying drawings in which.

DESCRIPTION OF THE PREFERRED EMBODIMENT

Figure 1:
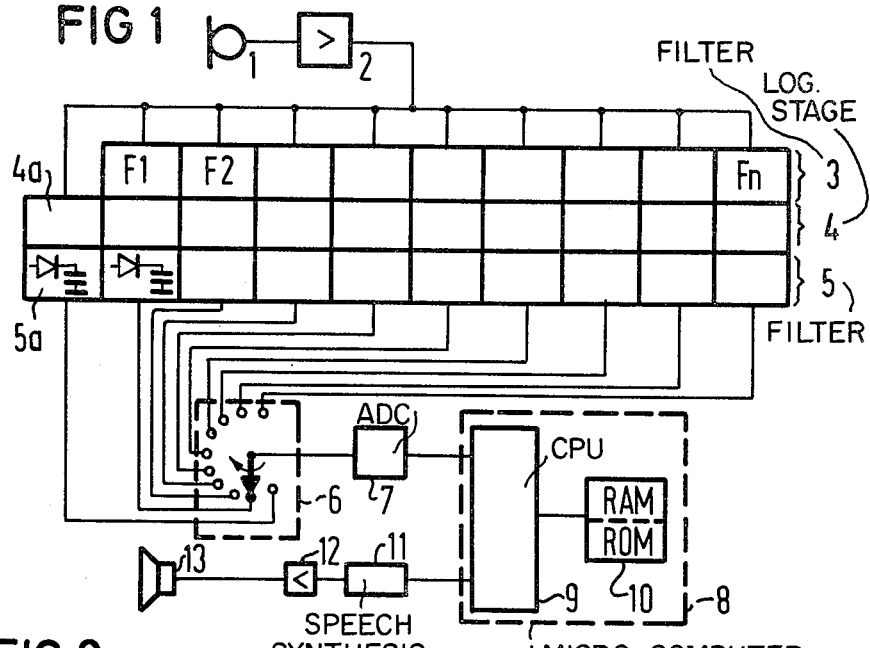
FIG. 1 is a schematic illustration of a speech recognition device in which a method of the present invention may be used.

Referring now to FIG. 1, a speech recognition device incorporates a microphone 1 and an amplifier 2 connected thereto. The microphone is connected to the inputs of a plurality of filters 3, which are band pass filters for transmitting individual portions of the frequency band transmitted by the amplifier 2. In one example, the amplifier 2 transmits a band of frequencies from 0.3 through 4.3 kHz, and the nine individual filters 3 have their center frequencies at approximately 0.36, 0.51, 0.69, 0.91, 1.21, 1.6, 2.15, 2.94, and 4.1 kHz. The pass bands of the filters 3, indicated individually and F1 through Fn, are preferrably adjacent to each other, so that all frequency components passed by the amplifier 2 are passed by one or two of the filters 3. Each filter 3 is connected to the input of a logarithmization stage 4, and the output of this is connected through a low pass filter 5. The outputs of the low pass filters 5 are connected to individual inputs of a sampling device 6. The output of the sampling device 6 is connected to the data input of a microcomputer 8, through an analog to digital converter 7. The microcomputer 8 has a central processing unit 9 and a memory unit 10, which is composed of RAM and ROM sections.

The data output of the microcomputer 8 is connected to a speech synthesis device 11, the output of which is connected to an amplifier 12 to a loudspeaker 13.

Preferably, an additional logarithmization stage 4a is provided, connected directly to the output of the amplifier 2, and an additional low pass filter 5a is connected between the stage 4a and an additional input of the sampling device 6.

The component frequencies passed by the band pass filters F1–Fn, which may be referred to as channel signals, are rectified, and conducted by means of the low pass filters 5 to inputs of the sampling device 6. The cut-off frequencies of the low pass filters are selected so that sampling of the levels of the channel signals can take place at 20 milisecond intervals. By means of the analog to digital converter 7, the sample values are digitized into 8 bit words. If the maximum time requirement for a spoken word is one second, then 50 sampled values may be taken for each of the 10 channels. Each sampled value is represented by an 8 bit word.

Figure 2:
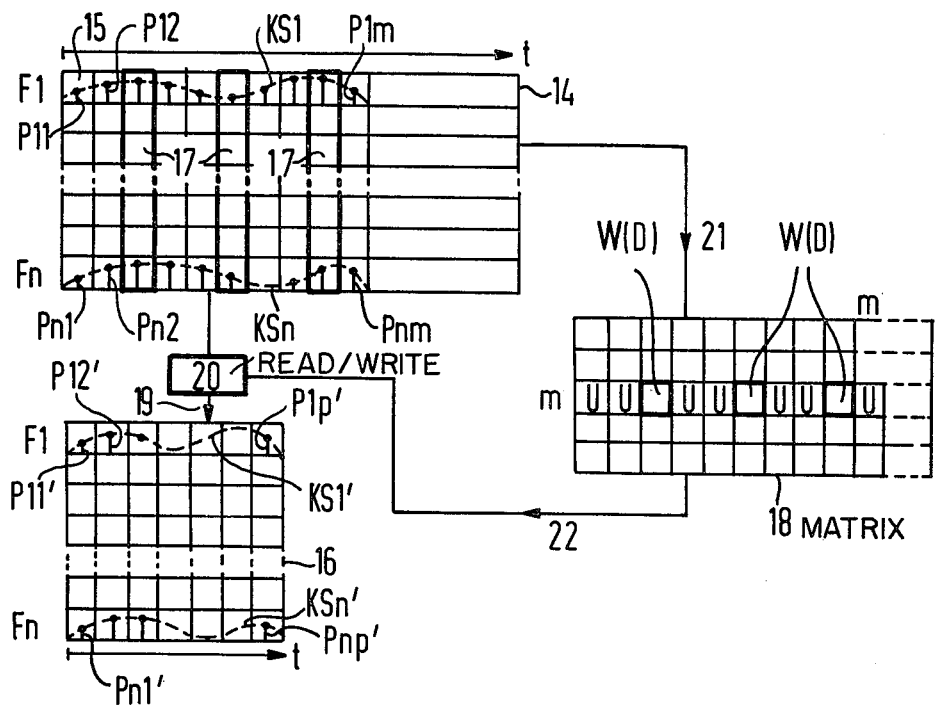
FIG. 2 is a schematic illustration of the transcription operation in accordance with an illustrative embodiment of the present invention.

FIG. 2 illustrates a memory matrix 14, which is representative of a part of the random access or RAM memory of the memory unit 10. The successively sampled values of one of the 10 channels signals are stored in the individual memory locations indicated in horizontal rows of the memory matrix 14. Each of the channels F1 through Fn is provided with a row of the matrix 14. Thus, the digitized level values P11 through P1m are stored in the first row of the matrix 14, given m sampling operations during the duration of a spoken word. The levels P21 through P2m reside in the second row, and so on. In each of the portions of the matrix 14, there are data storage locations, for storing the 8 bits of the word representing the amplitude of one of the channels at one of the sampling times. For example, the first sample level value P11, represents 8 memory locations. The matrix 14 allows the representation of time functions of the channel signals, two of which are indicated in FIG. 2 as KS1 and KSn.

The number m of sampling operations taking place during the duration of a spoken word, depends on the speech velocity. In order to suppress the influence of varying speech velocity on word recognition, a standardization to a prescribed word length is carried out. This takes place by means of a transcription of the information contained in the memory matrix 14 into a memory matrix 16, which has a standarized length of P columns, for each of the n rows. The matrix 16 is also representative of a part of the storage capacity of the RAM in the memory unit 10.

When $m = p + 3$, then, in transcribing the information from the array 14 into the array 16, three columns are omitted in the transcription. By so doing, a time sequence compression takes place of all the channel signals to a standardized word length corresponding to p sampling operations. If on the other hand, $m = p - 3$, an expansion is necessary in the transcription of the information from the matrix 14 into the matrix 16, by which three of the values stored in the matrix 14 are twice transcribed into adjacent columns of the matrix 16. In order to achieve the most homogeneous compression or expansion of the word length which is possible, so as not to distort the informational content of the channel signals KS1 through KSn, the group of sampling values which are omitted, or twice transcribed, are distributed as uniformly as possible among the m columns of the matrix 14. This occurs in such a manner that for every number m, there is a unique sequence of transcription decisions, which sequence is stored in memory matrix 18, which may be interpreted as part of the read-only memory ROM of the memory unit 10.

The information stored in the ROM, represented by the matrix 18, has a plurality of rows, one for each different possible value of m. For each row, that is for each possible value of m, a unique sequence is stored in the column locations of that row corresponding to the memory locations of the matrix 14 which are to be omitted or which are to be twice transcribed. This is indicated in matrix 18 by three boxes which are emphasized, and labeled with W(D).

Each row of the matrix 18 has m columns, corresponding to the number of sampling values stored in the matrix 14. The storage locations of each row which apply to locations of the matrix 14 which are to be once transcribed are indicated in FIG. 2 with a U, which indicates that a normal transcription is to take place. In each storage location where a W is stored, the data in the corresponding location in the matrix 14 is omitted, and for each location storing a D, the data in that location is to be transcribed in the two adjacent columns of the matrix 16. In this way, each line of data stored in m positions of the matrix 14, is transformed into a corresponding line of data having p columnar positions in matrix 16. This transcription takes place by means of a read-write unit 20 interconnected between the matrix 14 and the matrix 16, and controlled by the output of the matrix 18 over lines 22. The matrix 18 is addressed with the value m derived from matrix 14 over lines 21.

By use of the present method, acoustical word lengths from 280 miliseconds through 1000 miliseconds can be effectively standardized to 500 miliseconds.

The digitized channel-time patterns of the channel signals KS1' through KSn' contained in the matrix 16 are compared to corresponding comparison patterns of a series of comparison signals stored in the memory unit 10. The stored comparison signals correspond to prescribed words belonging to the vocabulary of the speech recognition device. When a spoken word corresponds to one of the stored words, coincidence between the two is identified in a recognition operation subsequent to the transcription operation. In one embodiment of the comparison operation, a difference is calculated between each of the level values P11'–Pnp' of the channel signals KS1'–KSn' and the corresponding stored level values, and all of the differences are summed. The same operation is carried out for each of the stored words. The sum total is then representative of the major of the dissimilarity of the comparison pattern of the spoken word to the individual stored words. The smallest sum then belongs to the stored word having the least dissimilarity with the spoken word. In this way, recognition of spoken words is effected, by recognizing a comparison with the characteristics of stored words.

The signal passing through the stages 4a and 5a is employed in a preferred embodiment of the invention in order to identify clearly the beginning and ending of a spoken word. The signal emanating from the stage 5a is sampled periodically and compared with a prescribed threshold value. This may take place if desired after an integration in order to discriminate against short pulses or noise. When the threshold value is exceeded, the beginning of the word is identified, and the sample values of the other nine channels are read into the memory unit 10, as indicated by the matrix 14. The end of the spoken word is recognized when the sample value produced at the output of unit 5a falls below a prescribed threshold value. This signal may also be integrated if desired before comparing it with the threshold level. When the signal falls below the threshold level, the storage of the sample signals is terminated. Alternatively, one of the channels KS1 through KSn can be used to identify the beginning and ending of spoken words.

In a specific embodiment of the present invention, the speech signal is divided into nine frequency bands, and a sampling rate of 20 milisecond intervals was employed. Words were standardized to 500 miliseconds, and the sample level values were digitized into 8 bit words. A vocabulary of 32 words was stored, and the steps of the present invention involving standardization of the length of the words, and comparison of them with the stored vocabulary, required only approximately 200 miliseconds.

In another embodiment of the present invention, the recognized word is produced acoustically by the loudspeaker 13, by means of the speech synthesis device 11, in response to the words which are recognized. In this way, the user of the speech recognition device is immediately informed of correct recognitions of spoken words, and if necessary, can repeat the word so that it is properly recognized.

The present invention finds an advantageous use in the derivation of electrical signals from a series of prescribed command words, which signals may be used for performing functions such as selecting electrical switching commands for example. Such switching commands may be used for a variety of functions, such as for example, moving artificial limbs and the like.

It will be appreciated that the matrix 18 may be embodied in a ROM which stores a group of control signals for each possible value of m between upper and lower limits. The quantity m is determined either by a timer, which counts clock pulses during the period the threshold circuit produces a signal, indicating the interval of the spoken word, or by inspection of the address register which controls the allocation of memory cells of the matrix 14. In either case, the quantity m serves effectively as an address for the ROM matrix 18, so that an appropriate group of control signals is produced.

The control signals may be used in a variety of ways to control transcription of the stored signals from the format of the matrix 14 to the format of the matrix 16. For example, the digital signals stored in the matrix 15 may be read out, column by column, and simultaneously written into the matrix 16, on a column by column basis, with the control signals from the ROM 18 controlling the incrementing of the address register for the matrix 16, with each address designating a column in the matrix 16 for storing bits of corresponding times, in the m rows of the matrix 16. When the control signal for a given column is U, the address register is incremented normally. When the control signal is W, the address register is not incremented, so that the last data written into the matrix 16 is overwritten and erased, when p is less than m. When the control signal is D, the address register is incremented twice, with the same data being read into successive columns of the matrix 16.

Alternatively, a gating arrangement may be employed, for interconnecting the m output read out of the matrix 14 to the p inputs of the matrix 16, with the data being read out in successive rows, with all of the signals for a given row being transferred during the same time interval.

The gating arrangement may incorporate a plurality of gates controlled by a logic circuit responsive to the control signal output from the matrix 18. Design of such a gating arrangement is well within the capabilities of those skilled in the art, and therefore need not be described in detail.

It will be appreciated that the distribution of W and D control words or signals within the matrix 18 is as uniform as possible throughout the time duration of the spoken word. For example, if m and p differ by only one, only a single W or D control word is required, and it is positioned approximately midway between the m storage locations in a row of the matrix 18. If m and p differ by two, the two W or D control words are located at about $\frac{1}{3}$ and $\frac{2}{3}$ of the way between 1 and m. If m and p differ by three, the W or D control words are spaced apart by about $\frac{1}{4}$ m, and so on.

The method and apparatus described above provide an efficient and rapid way of achieving the required chronological compression or expansion of the spoken word, to facilitate recognition thereof. It will be apparent that various modifications or additions may be made, without departing from the essential features or novelty of the present invention, which are defined and secured by the appended claims.

What is claimed is:

1. A method for operating a speech recognition device in which a plurality of rectified channel signals of different frequencies are derived from the speech signal of a spoken word, said channel signals being periodically sampled and digitized to produce digital signals which are stored in a digital memory and compared with a plurality of stored groups of corresponding comparison signals, and in which the group of comparison signals producing the best coincidence is employed as the recognition result, comprising the steps of modifying one of said digital signals having a channel-time pattern (P11 ... Pmn) by suppressing bits belonging to a prescribed group of sampled values or storing multiple copies of bits belonging to said prescribed group, said group being prescribed as a function of the overall number (m) of sampling operations which take place within the acoustical word duration, so that the modified channel-time pattern (P11' ... Pnm') correspond to a standardized plurality (p) of sampling operations, and comparing the modified channel-time pattern (P11' ... Pnp') with the stored groups of corresponding patterns of comparison signals.

2. The method according to claim 1, including the step of logarithmizing said channel signals and filtering said channel signals through individual low pass filters.

3. The method according to claim 1, including the step of digitizing said sampled channel signals into 8 bit words.

4. The method according to claim 1, including the step of comparing the modified channel-time pattern (P11' ... Pp') to the corresponding stored patterns of comparison signals by determining the difference between corresponding signals and summing all of such differences, to produce a comparison signal for each group, and employing the comparison signal allocated to the lowest sum as the recognition result.

5. The method according to claim 1, including the step of comparing the level of the signal in one of said channels to a theshold value for determining the beginning and end of a spoken word.

6. The method according to claim 1, including the step of producing an acoustical output of the word corresponding to the one of said groups having the best comparison with said digital signals.

7. The method according to claim 1, including the step of deriving control signals for electrical switches in response to spoken words.

8. The method according to claim 7, including the step of using said switching signals for moving artificial limbs.

9. A speech recognition device comprising in combination, a plurality of band pass filters connected to the output of a microphone for passing a plurality of frequency bands, a plurality of logarithmization stages individually connected to the outputs of said filters, a plurality of rectifier and low pass stages individually connected to said logarithmization stages, a sampling device having a plurality of inputs connected to the outputs of said rectifier and low pass stages, for sequentially selecting said channels in sequence, an analog to digital converter connected to the output of said sampling device, a microcomputer connected to said analog to digital converter, said microcomputer having a storage device for storing digital signals produced by said sampling device during the duration of a spoken word, means for transcribing said digital signals from one location to another in said storage device by omitting preselected bits of said digital signals or multiply recording preselected bits of said digital signals, means for comparing said transcribed digital signals with a plurality of groups of stored digital signals and for producing an output representative of the group of storage signals which best compares with said digital signals, a speech synthesis device connected to receive said signals for producing an audible output of a word corresponding to a stored group comparing favorably with said digital signals, and a loudspeaker connected to said synthesis device.

10. The speech recognition device according to claim 9, including a further logarithmization stage connected in parallel width said band pass filters, a further rectifier and low pass stage connected to the output of said further logarithmization stage, and means for connecting said further rectifier and low pass stage to an input of said sampling device.

* * * * *